United States Patent
Huston, III

(10) Patent No.: US 11,283,648 B2
(45) Date of Patent: Mar. 22, 2022

(54) RESILIENT TUNNELS

(71) Applicant: Forcepoint LLC, Austin, TX (US)

(72) Inventor: Lawrence B. Huston, III, Ann Arbor, MI (US)

(73) Assignee: FORCEPOINT LLC, Austin, TX (US)

( * ) Notice: Subject to any disclaimer, the term of this patent is extended or adjusted under 35 U.S.C. 154(b) by 109 days.

(21) Appl. No.: 16/541,283

(22) Filed: Aug. 15, 2019

(65) Prior Publication Data

US 2021/0051043 A1 Feb. 18, 2021

(51) Int. Cl.
*H04L 12/46* (2006.01)
*H04L 47/125* (2022.01)
*H04W 80/06* (2009.01)
*H04L 67/1008* (2022.01)

(52) U.S. Cl.
CPC ........ *H04L 12/4633* (2013.01); *H04L 47/125* (2013.01); *H04L 67/1008* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 7,483,399 B2 | 1/2009 | Zelig et al. | |
| 8,327,437 B2 | 12/2012 | McAlister | |
| 9,319,300 B2 | 4/2016 | Huynh Van et al. | |
| 10,397,044 B2 | 8/2019 | Chu et al. | |
| 2003/0084135 A1 | 5/2003 | Narain | |
| 2004/0197079 A1* | 10/2004 | Latvala | H04L 29/06 386/200 |
| 2008/0002669 A1 | 1/2008 | O'Brien et al. | |
| 2010/0306410 A1* | 12/2010 | Jansen | H04L 67/16 709/245 |
| 2011/0035437 A1* | 2/2011 | Toumura | H04L 67/1002 709/203 |
| 2011/0096670 A1 | 4/2011 | Cheng et al. | |
| 2014/0351812 A1* | 11/2014 | Imai | H04L 12/4633 718/1 |
| 2015/0067819 A1* | 3/2015 | Shribman | H04L 67/2838 726/12 |
| 2018/0191635 A1 | 7/2018 | Karthikeyan et al. | |
| 2019/0327312 A1* | 10/2019 | Gupta | H04L 63/02 |

FOREIGN PATENT DOCUMENTS

| | | |
|---|---|---|
| GB | 2386033 A | 9/2003 |
| WO | 2019068017 A1 | 4/2019 |

* cited by examiner

*Primary Examiner* — Jenkey Van
(74) *Attorney, Agent, or Firm* — Jackson Walker LLP; Christopher J. Rourk

(57) ABSTRACT

A system for controlling data services, comprising a plurality of host computers configured to communicate over the network and to request a data tunnel. A plurality of server computers configured to provide data tunnel services to the plurality of host computers. An address allocator operating on one or more processors and configured to implement one or more algorithms that cause a range of addresses to be assigned to each of the server computers, wherein each of the host computers receives one of the addresses for use as part of a data tunnel service request from the host computer to the server computer.

20 Claims, 4 Drawing Sheets

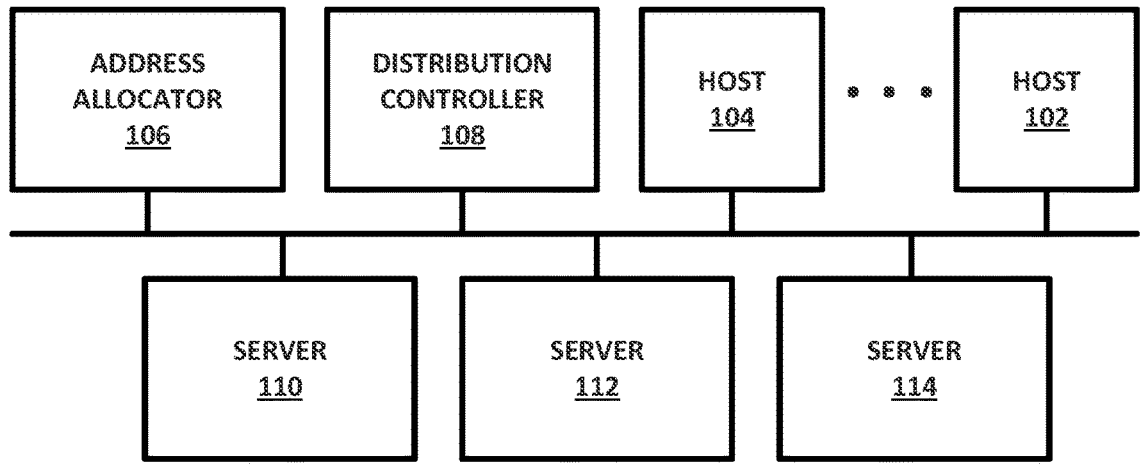
FIGURE 1     100
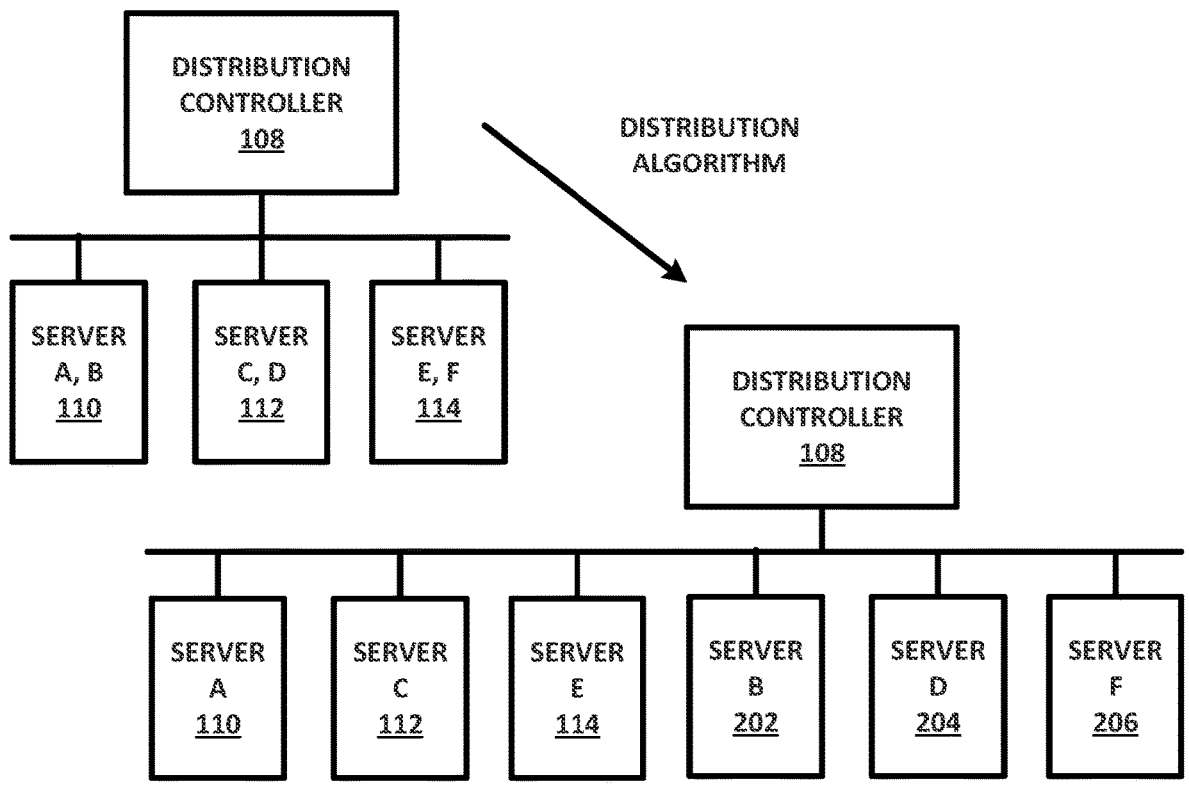
FIGURE 2     200

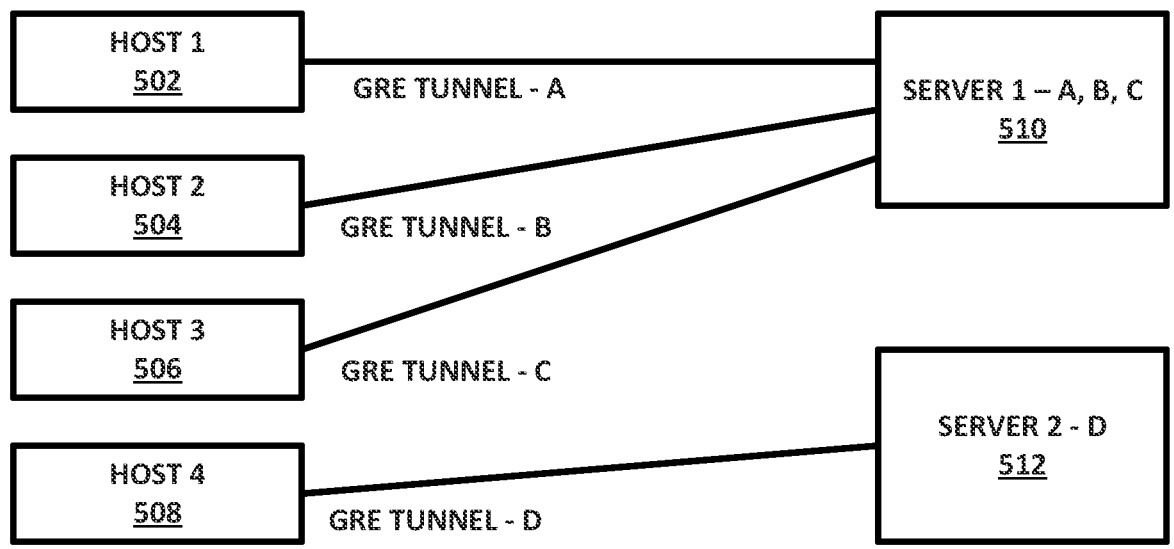
FIGURE 5      500
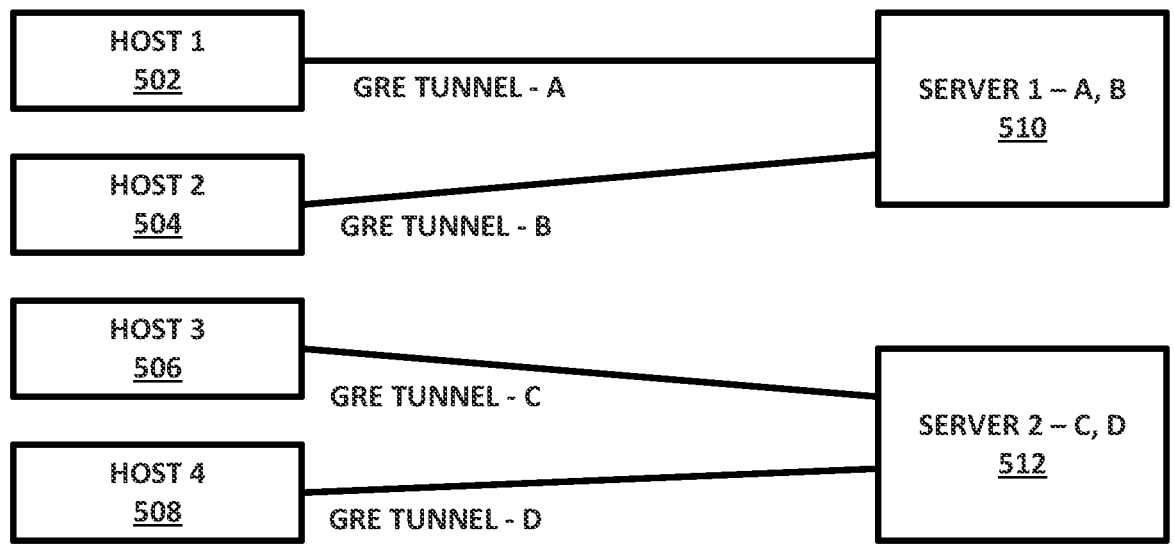
FIGURE 6      600

RESILIENT TUNNELS

TECHNICAL FIELD

The present disclosure relates generally to data services, and more specifically to a system and method for providing resilient data tunnel services to client computers.

BACKGROUND OF THE INVENTION

Data tunnel services are known in the art. The infrastructure requirements for setting up a data tunnel to a client or host typically includes a dedicated address for the client or host that makes load balancing difficult to implement.

SUMMARY OF THE INVENTION

A system for controlling data services is disclosed. The system includes a plurality of host computers configured to communicate over the network and to request a data tunnel. A plurality of server computers are configured to provide data tunnel services to the plurality of host computers. An address allocator operating on one or more processors is configured to implement one or more algorithms that cause a range of addresses to be assigned to each of the server computers, wherein each of the host computers receives one of the addresses for use as part of a data tunnel service request from the host computer to the server computer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for service aliasing and pooled load balancing, in accordance with an example embodiment of the present disclosure;

FIG. 2 is a diagram of a system for service aliasing and pooled load balancing, in accordance with an example embodiment of the present disclosure;

FIG. 5 is a diagram showing an unbalanced GRE tunnel system, in accordance with an example embodiment of the present disclosure;

FIG. 6 is a diagram showing a balanced GRE tunnel system, in accordance with an example embodiment of the present disclosure.

DETAILED DESCRIPTION OF THE INVENTION

Figure 3:
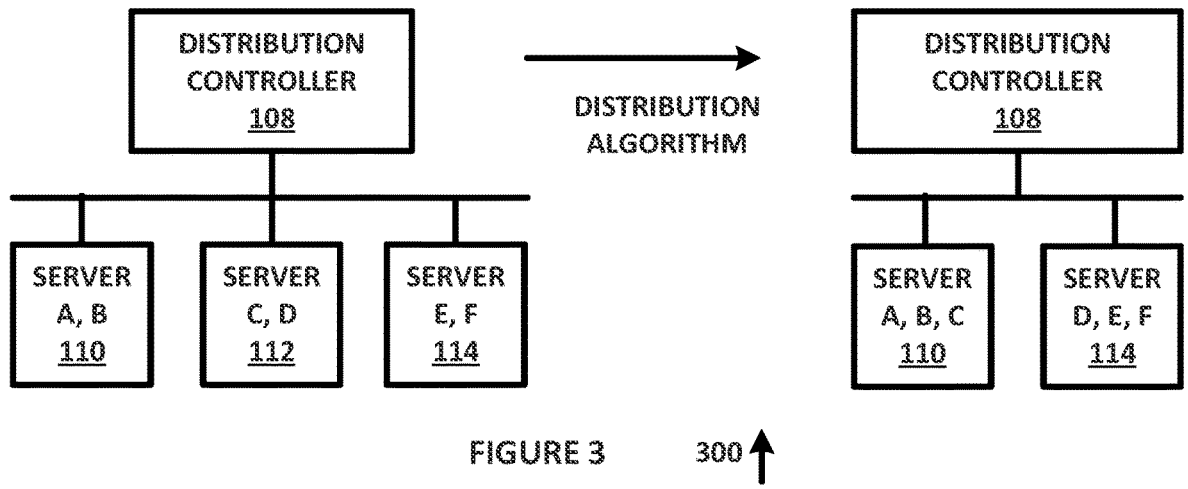
FIG. 3 is a diagram of a system for service aliasing and pooled load balancing, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Traditionally, the relationship between Internet Protocol (IP) addresses and data processors (servers) that provide data services over a network to a host has been treated as tightly coupled, and often each data service has one or more servers running behind a single IP address (or small pool of addresses). This approach has made scaling the provision of services to a large number of hosts difficult. It also makes it difficult to pass information to the service if the protocols themselves do not support that information.

The present disclosure can be understood as an inversion of the relationship between IP addresses and services. In IPv6, addresses contain 128 bits, as opposed to the 32 bit IP addresses that have been used for IPv4. The increase in the number of bits has allowed Internet addresses to be assigned for any device on a network, and also allows a separate address to be assigned to a device for a service. For example, in Amazon Web Services, each IPv6 subnet is provided with a 64 bit prefix, which corresponds to roughly $2^{64}$ addresses that can be used on that subnet. This number of address for use on a single subnet is $2^{32}$ times greater the total number of addresses available to all users in IPv4.

The present disclosure provides a system and method for assigning a pool of IPv6 addresses to a service that are routed to the same subnet, which allows all the individual addresses to be used as aliases to that service. A local decision can then be made regarding which server in the subnet should be used to handle each address, as a function of a local policy such as load balancing, security or other suitable policies.

In one example embodiment, the upper bits of an address can be used to identify a service, and the lower bits of the address can be used to create a tag, as shown below: IPv6 address bits:

[1 (service) 31][32 (service) 63][64 (service) 95][96 (tag) 128]

Different services can then use the tag bits in different ways, as disclosed and described further herein. For example, the tag bits can be used for identification, such as by encoding a customer ID, to allow the identity of the customer making the request to be known and used to optimize the service. In another embodiment, the tag value can be randomized for load-balancing. In a third embodiment, the DNS query string can be encoded in the query results. Other uses that are consistent with the teachings of the present disclosure are also possible.

To manage the pool of addresses, a distribution controller can be responsible for determining which tags are owned by which active servers. The distribution controller can be a separate service operating on a single processor, a distributed algorithm operating one two or more processors that use a consensus process for selecting an address for a host, or other suitable systems or processes. The tag assignments can be implemented as a contiguous range, a collection assigned through consistent hashing or in other suitable manners.

In one example embodiment, a set of tags can correspond to a set of IPv6 addresses (which are the concatenation of the service address and the tag). IPv6 forwarding or other suitable processes can be used to get the tags (IPv6 addresses) to the servers responsible for processing service requests associated with those tags. For example, IPv6 address aliases can be added on the network interface for each address they are responsible for, the servers can use loopback interfaces and advertise routes out their physical interfaces to receive traffic sent to their pool addresses, an overlay network in the subnet can be used to forward traffic, Linux IP table rules can be used to forward the traffic, or other suitable processes can also or alternatively be used.

In addition to assigning groups of addresses to each server, a logical assignment agent can be used to provide an address for external clients to use, such as a domain name system (DNS), explicit lookup, application program interfaces (APIs) and so forth. The logical assignment agent can select an assignment policy from a set of assignment policies to achieve the goals of the service, can use a predetermined assignment policy or can implement assignment policies in other suitable manners. A logical assignment agent can be used to maximize scaling, such as to perform a random assignment to statistically distribute traffic across the tag pool or in other suitable manners. For applications that require customer affinity, the logical assignment agent can take the customer ID into account when allocating addresses, such as to send all traffic from the customer to the same server or for other suitable purposes.

An example use case for the use of a logical assignment agent is to build a DNS service that has different policies for each customer. DNS does not provide a way to pass customer ID information in the request, and this is typically performed out of band by registering the source IP addresses or in other manners that can fail in many cases, such as where a user is mobile. The present disclosure avoids the problem inherent in the DNS approach by allocating a pool of IPv6 addresses and using the tag portion of those addresses to encode a customer ID.

For example, if the address pool uses the address range 2001:0db8:85a3:0000:0000:8a2e:0370::/112, the bottom 16 bits of the address can be used as the tag to encode the customer ID. This would give each customer a unique IP address to use as their DNS server, such as:

Customer a: 2001:0db8:85a3:0000:0000:8a2e:0370:0001
Customer b: 2001:0db8:85a3:0000:0000:8a2e:0370:0002
Customer c: 2001:0db8:85a3:0000:0000:8a2e:0370:0003

And so forth. While a separate DNS server would need to be set up for each customer using existing processes, the present disclosure can use a single server and setup forwarding so all traffic arrives at the single server. The single server can then use the destination address and the tag bits to determine the customer and return the correct result for the customer's policy.

The use of a round robin DNS addresses some of the problems with existing processes, but does not allow state transfer and is harder to operate upon fail over or in response to other unexpected operating conditions. State transfer is typically performed out of band by using beaconing or other techniques to replicate registry values. Overlay networks can be used in clusters to handle endpoint migration (e.g. kubernetes), which can be used to implement balancing, but which is not the same as sharing the addresses across the service.

Services can be tied to a single or small number of IP addresses. To handle failure and load-balancing, services have used various strategies. One approach uses DNS to map machine names to a pool of servers. To send the hosts to the correct server, the DNS servers keep a mapping of which servers are up and return addresses based on the current server state, which creates a tight binding between resolution of DNS names and the server state. Additionally, the caching of DNS responses can make it difficult to remove servers from service or to handle failures of a particular server.

Another approach is to create a virtual address that is shared among multiple servers. Typically, this address is assigned to a load-balancing device that sits on the data path and rewrites packet addresses to the servers. The load balancer works well up to some limit, after which a bottleneck can be formed. In addition, a load balancer is a single point of failure and requires high-performance hardware.

The present disclosure is directed to "service aliasing," which uses a range of IPv6 addresses that get routed to the same location. All addresses that have that same pool prefix are treated as heading to the same service. In the pool, there can be a distribution controller that is responsible for determining which addresses are associated with which active servers. The distribution controller can be a separate service, can be a distributed algorithm that will reach a consensus between multiple services, or can be implemented in other manners. The addresses can be assigned in a contiguous range, a collection assigned through consistent hashing or in other suitable manners.

When a client wants to communicate with the service, it contacts an assignment agent which returns an address in the pool, such as a DNS service that returns a random address from the alias pool to the client. Selecting addresses based on consistent hashing of the customer ID, using an API to get the service endpoint or other suitable processes could also or alternatively be used, but the assignment agent does not need to know about the health of the individual server, and only needs to know the pool range and the desired algorithm for allocation.

With the service aliasing, the addresses in the pool can be mapped to individual servers. A dynamic distribution controller (algorithm or service) that reallocates pool addresses at runtime can be provided to support load-balancing. For the load-balancing case, each server can be configured to handle a request from any client. If affinity based on the client characteristics is required, the assignment agent can use affinity parameters to provide a selection function when giving out addresses, such as by matching the affinity parameters to parameters associated with each address or in other suitable manners.

Once a client has received a target address for a service, it can connect to the service using that address. If servers have too much load, a new server can be created. When the new server is available, it can invoke the distribution algorithm, and the new server can become responsible for a portion of the address space.

Data transmission over a network is subject to a number of conditions that can delay data communications or expose them to unauthorized access by third parties. For example, certain classes of data may be transmitted at lower priority than other classes of data, which can result in data communications that are related to the same application being received at different times. In another example, a third party can monitor data packets and extract data contained within those packets, unless it is encrypted. In order to keep all of the different channels of data secure, they all would need to be separately encrypted.

In another embodiment, an overlay infrastructure that uses tunneling can be used to facilitate data communications, to ensure that all data communications are transmitted with the same priority and also to reduce the number of different encryption channels. Building an overlay infrastructure using tunneling has operational challenges, though. Some common tunneling technologies, such as Generic Routing Encapsulation (GRE), are configured using IP addresses. Because the termination point is fixed, there are operational issues if you want to move the tunnel termination point due to due to load or other capacity issues. To move the termination point, you need the owner of the remote device to reconfigure the tunnel to use the new address. This reconfiguration can impose a substantial administrative hassle for both the customer and the endpoint provider.

Even when tunnels connect via domain name system (DNS) names (like many IP security clients), vendor-specific implementation bugs can still cause complications. One common problem is that vendors will perform the DNS resolution once at startup and then keep using the same IP address until the administrator restarts the device (or process). Requiring administrator intervention interrupts the customer experience. While it is possible to address these issues when a single vendor operates both ends of a communication link and implements a signaling protocol, but this is not commonly the case with our Edge customers.

In one example embodiment, "service aliasing" can be used for tunneling, such as by treating all addresses that have that same pool prefix as heading to the same service. In the pool, there is a distribution controller responsible for determining which service tags are processed by which active servers. In this example, the distribution of tags may affect the distribution of tunnels. Calculating the distribution can be automated, or can be accomplished in other suitable manners.

When creating tunnel endpoints, tags can be allocated from the pool to satisfy the operational requirements. If the implementation of service aliasing supports a large number of addresses, a new tag can be assigned for each tunnel to provide flexibility. Likewise, with a smaller tag pool, tunnels can be allocated based on heuristics, such as the expected tunnel sizes. When a client configures the tunnel, they can use the allocated address that was derived from the tag, and can transparently connect to the server responsible for that service tag.

In order to alleviate the load on any server if it is too high, one option is to re-allocate the tags to a server with spare capacity. Another option is to instantiate a new server and reallocate the tags to take advantage of the new resources. The allocation algorithm can use the prior history to predict load and make appropriate allocations. For stateless tunneling protocols like GRE, this allocation happen transparently. For stateful protocols like Internet Protocol Security (IPSec), the implementation can migrate the state to the other server, force a renegotiation of the connection or use other suitable processes.

While load-balancing, network address translation or other similar devices can be used to distribute the load, those device can also run into similar scaling challenges. Virtual router redundancy protocol (VRRP), hot standby router protocol (HSRP) or other similar processes also allow sharing of addresses, but these processes nevertheless cause all connections to still go to the same IP address, and thus provides fault tolerance but not load distribution.

FIG. 1 is a diagram of a system 100 for service aliasing and pooled load balancing, in accordance with an example embodiment of the present disclosure. System 100 includes hosts 102 and 104, address allocator 106, distribution controller 108 and servers 110, 112 and 114, each of which can be implemented in hardware or a suitable combination of hardware and software.

Hosts 102 through 104 are a plurality of hosts that can each be one or more processors that implement one or more algorithms that configure the associated processors to request services from servers 110 through 114. In one example embodiment, hosts 102 through 104 can request an address for communicating with a specific service and can be provide with an address for one or more of servers 110 through 114. Service requests are then transmitted from host 102 though host 104 to a corresponding one of servers 110 through 114, and responses to the service requests are provided from the corresponding one of servers 110 through 114. Hosts 102 through 104 can be given an address to communicate with a service, and not a specific server 110 through 114. The mapping of service addresses to servers 110 through 114 can be performed locally by one or more of servers 110 through 114, and hosts 102 through 104 can be unaware of the mapping process.

Address allocator 106 can include one or more processors that are configured to implement one or more algorithms that configure the processors to assign one or more addresses to each of servers 110 through 114, such as to facilitate communication with each of server 110 through 114. In one example embodiment, address allocator 106 can be implemented as a distributed algorithm that reaches a consensus between multiple services or in other suitable manners. In another example embodiment, the addresses can include a range of addresses in IPv6 format, where a first part of the range of the IPv6 address format can be associated with a specific one of servers 110 through 114, and where a second bit sequence of the IPv6 address format can be associated with one or more services.

Distribution controller 108 can include one or more processors that are configured to implement an algorithm that selects and assigns hosts 102 through 104 to servers 110, 112 and 114, such as to allow the servers 110, 112 and 114 to provide services to the hosts 102 through 104. In one example embodiment, distribution controller can be implemented as a distributed algorithm that reaches a consensus between multiple services for each allocation of a host to a service, or other suitable processes can also or alternatively be used, such as tracking server loading data at a central manager.

Servers 110, 112 and 114 can include one or more processors that are configured to implement one or more algorithms that are configured to provide services to hosts, such as hosts 102 through 104. In one example embodiment, servers 110, 112 and 114 can have a range of addresses that are assigned to hosts, and each host can communicate directly with each server using a different address, as discussed further herein. These addresses can be reassigned to different servers to implement load balancing, new addresses can be assigned to a host to implement load balancing or other suitable processes can also or alternatively be used.

In operation, system 100 is used to facilitate load allocation to servers 110, 112 and 114 for services provided to hosts 102 through 104, and to reallocate hosts 102 through 104 as a function of loading, such as to increase or decrease the number of servers in operation. System 100 utilizes IPv6 address pools that can be statically or dynamically assigned to hosts 102 through 104 and servers 110, 112 and 114.

FIG. 2 is a diagram of a system 200 for service aliasing and pooled load balancing, in accordance with an example embodiment of the present disclosure. System 200 includes distribution controller 108 and servers 110, 112, 114, 202, 204 and 206, each of which can be implemented in hardware or a suitable combination of hardware and software.

System 200 demonstrates a migration from a first configuration in which server 110 is providing services A and B, server 112 is providing services C and D and server 114 is providing services E and F, to a second configuration in which server 110 is providing service A, server 112 is providing service C, server 114 is providing service E, server 202 is providing service B, server 204 is providing service D, and server 206 is providing service F. This migration is accomplished by a distribution algorithm that operates on distribution controller 108, which can be a centralized service, a distributed algorithm that reaches a consensus between multiple services for each allocation of a host to a service, or other suitable processes can also or alternatively be used. For example, when the load on server 110 for services A and B reaches a predetermined processor loading, then server 110 can contact distribution controller 108 and request reallocation of services. Likewise, distribution controller 108 can monitor the load on servers 110, 112 and 114, and can determine whether the load requires additional servers to be instantiated, such as servers 202, 204 and 206, and how to re-allocate the load from servers 110, 112 and 114 to the new servers 202, 204 and 206. In one example embodiment, the addresses associated with service B at server 110 can be assigned to server 202, the addresses associated with service D at server 112 can be assigned to server 204 and the addresses associated with service F at server 114 can be assigned to server 206.

In another example embodiment, the addresses associated with service B at server 110 can be de-allocated and new addresses can be assigned to the clients/hosts that are associated with the de-allocated addresses to cause those clients to use server 202, the addresses associated with service D at server 112 can be de-allocated and new addresses can be assigned to the clients/hosts that are associated with the de-allocated addresses to cause those clients to use server 204 and the addresses associated with service F at server 114 can be de-allocated and new addresses can be assigned to the clients/hosts that are associated with the de-allocated addresses to cause those clients to use server 206. Additional processes can also or alternatively be used to migrate data associated with the services, or for other suitable purposes.

In the example embodiment shown in system 200, new servers are being added. System 200 can use suitable techniques for connection draining or state synchronization to ensure existing connections are not dropped. The clients/hosts can continue using the original addresses they were given, and they can be balanced across the new pool of servers, or other suitable processes can also or alternatively be used.

FIG. 3 is a diagram of a system 300 for service aliasing and pooled load balancing, in accordance with an example embodiment of the present disclosure. System 300 includes distribution controller 108 and servers 110, 112 and 114, each of which can be implemented in hardware or a suitable combination of hardware and software.

System 300 demonstrates a migration from a first configuration in which server 110 is providing services A and B, server 112 providing services C and D and server 114 providing services E and F, to a second configuration in which server 110 is providing services A, B and C and server 112 is providing services D, E and F. This migration is accomplished by a distribution algorithm that operates on distribution controller 108, which can be a centralized service, a distributed algorithm that reaches a consensus between multiple services for each allocation of a host to a service, or other suitable processes can also or alternatively be used. For example, when the load on server 110 for services A and B reaches a predetermined processor loading, then server 110 can contact distribution controller 108 and request reallocation of services. Likewise, distribution controller 108 can monitor the load on servers 110, 112 and 114, and can determine whether the load requires additional one of those servers to be de-allocated. Other suitable embodiments and processes can also or alternatively be used.

In another example embodiment, the addresses associated with service C at server 112 can be de-allocated and new addresses can be assigned to the clients/hosts that are associated with the de-allocated addresses to cause those clients to use server 110, and the addresses associated with service D at server 112 can be de-allocated and new addresses can be assigned to the clients/hosts that are associated with the de-allocated addresses to cause those clients to use server 114. Additional processes can also or alternatively be used to migrate data associated with the services, or for other suitable purposes.

Under a reduced load, the servers can detect that they are underutilized and remove one from service. The distribution controller/algorithm will reassign the addresses to other servers. System 300 illustrates these changes. As above, standard techniques for connection draining and so forth can be used to ensure that existing connections are not dropped during re-assignment. The clients can continue using the service addresses they were given without any modifications. Node failure can be handled in a similar way, such as if a server dies, the distribution controller/algorithm redistributes the address ranges to the available servers and the clients will use their service alias.

Figure 4:
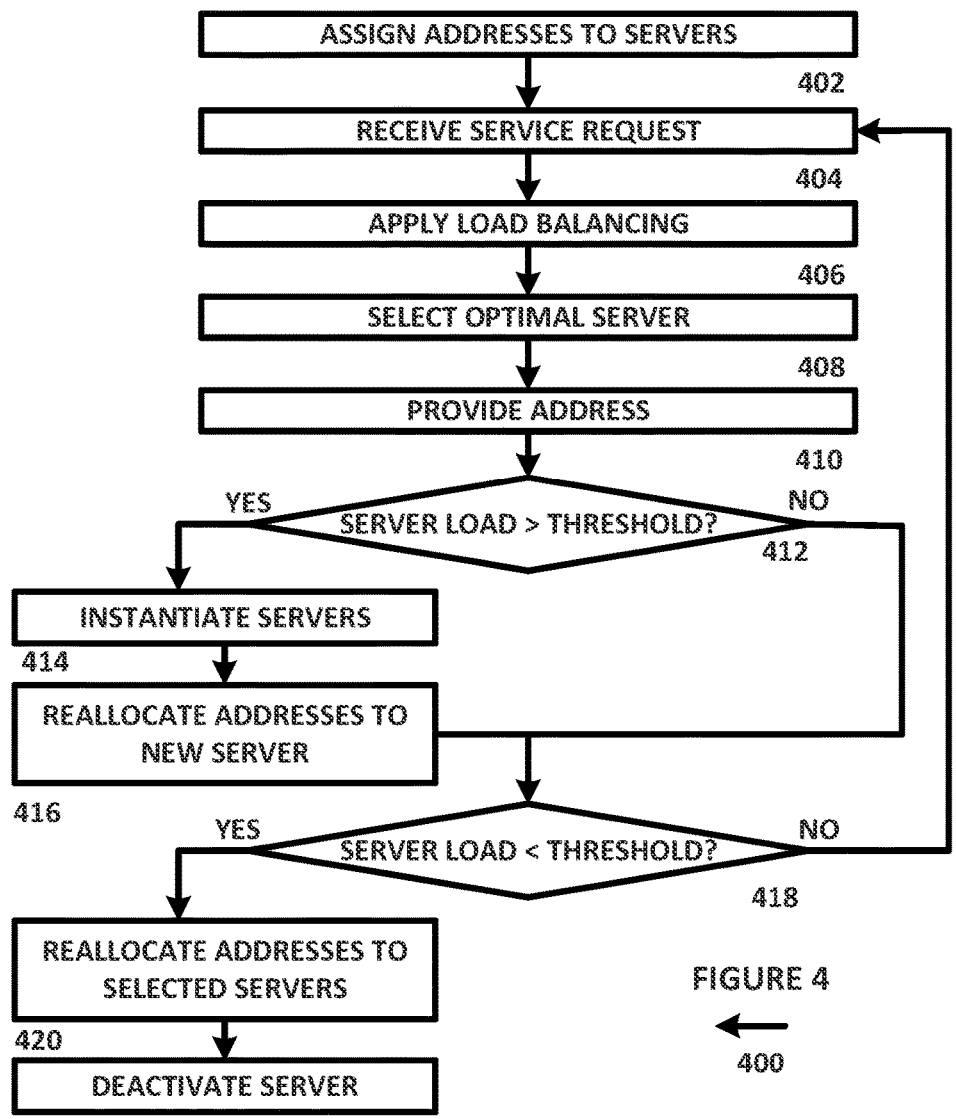
FIG. 4 is a diagram of an algorithm for service aliasing and pooled load balancing, in accordance with an example embodiment of the present disclosure.

FIG. 4 is a diagram of an algorithm 400 for service aliasing and pooled load balancing, in accordance with an example embodiment of the present disclosure. Algorithm 400 can be implemented in hardware or a suitable combination of hardware and software, and can be one or more algorithms operating on one or more processors.

Algorithm 400 begins at 402, where a processor assigns addresses to servers. In one example embodiment, the processor can assign a range of tags in an IPv6 address to a server address, such as where the server address includes a predetermined single value for a predetermined first range in the IPv6 address and where the tags include a predetermined second range in the IPv6 address. In this example embodiment, the first bits can be the most significant bits, such as the 96 most significant bits of the IPv6 address for the server, and the second bits can be the least significant bits, such as any of the 32 least significant bits of the IPv6 addresses for the server. In this example embodiment, the most significant 96 bits of the addresses can readily identify the server, and the least significant 32 bits can readily identify the clients or hosts that are receiving services from the server. Likewise, other suitable ranges or processes can also or alternatively be used. The algorithm then proceeds to 404.

At 404, a service request is received. In one example embodiment, the service request can be received at one or more processors that are under control of one or more algorithms that cause the service request to be distributed to one or more servers, such as a distribution controller or in other suitable manners. The algorithm then proceeds to 406.

At 406, load balancing is performed. In one example embodiment, load balancing can be performed at one or more processors that are under control of one or more algorithms that cause the processors to determine a loading at each of a plurality of servers. The loading can be determined by accessing a processor load data register that stores continuously updated processor load data, by transmitting a request over a network to one or more processors and receiving load data in a response message, or in other suitable manners. The algorithm then proceeds to 408.

At 408, an optimal server is selected. In one example embodiment, the optimal server can be selected by one or more processors that are under control of one or more algorithms that cause processors to identify a server with the lowest loading, the server with a lowest historical loading, the server with the greatest decrease or increase in loading, or other suitable servers. In one example embodiment, the algorithm can compare loading data for servers until a server with a lowest loading, a highest loading or other suitable loadings is determined, the algorithm can sort loading data or other suitable processes can also or alternatively be used. The algorithm then proceeds to 410.

At 410, an address is provided. In one example embodiment, the address can be provided by one or more processors that are under control of one or more algorithms that cause an address to be selected for an optimal server, such as a server that has the lowest loading, a server that does not have the highest loading or other suitable servers. The algorithm then proceeds to 412.

At 412, it is determined whether a server load is greater than a threshold. If it is determined that a server load is greater than a threshold, the algorithm proceeds to 414, otherwise the algorithm proceeds to 418.

At 414, servers are instantiated. In one example embodiment, the servers can be instantiated by one or more processors that are under control of one or more algorithms that cause the processors to start and configure a server for operation, such as by selecting one or more software applications, one or more configuration settings, one or more variables or other suitable data and to cause the server to begin operating pursuant to such applications, configuration settings, variables or in other suitable manners. The algorithm then proceeds to 416.

At 416, addresses are reallocated to a new server. In one example embodiment, the addresses can be reallocated by one or more processors that are under control of one or more algorithms that cause the processors to assign a server address to a new host or client, that assign a host or client address to a new server or in other suitable manners. The algorithm then proceeds to 418.

At 418, it is determined whether a server load is greater than a threshold. If it is determined that the server load is greater than the threshold, the algorithm proceeds to 420, otherwise the algorithm returns to 404.

At 420, addresses are reallocated to selected servers. In one example embodiment, the addresses can be reallocated by one or more processors that are under control of one or more algorithms that cause the processors to assign a server address to a new host or client, that assign a host or client address to a new server or in other suitable manners. The algorithm then proceeds to 422.

At 422, servers are deactivated. In one example embodiment, the servers can be deactivated by one or more processors that are under control of one or more algorithms that cause the processors to shut down a server, such as by selecting one or more software applications, one or more configuration settings, one or more variables or other suitable data and to cause the server to stop operating pursuant to such applications, configuration settings, variables or in other suitable manners.

Although algorithm 400 is shown as a flow chart algorithm, it can also or alternatively be implemented using object oriented programming, ladder diagrams, state diagrams or other suitable programming paradigms. Algorithm 400 can be implemented on a single processor, on multiple processors or in other suitable manners.

FIG. 5 is a diagram 500 showing an unbalanced GRE tunnel system, in accordance with an example embodiment of the present disclosure. Diagram 500 includes host 1 502, host 2 504, host 3 506 and host 4 506, each of which has an associated GRE tunnel A through D, respectively. Server 1 510 is assigned tags A through C, and server 2 512 is assigned tag D. The load on each server is proportional to the number of tunnels assigned to the server, which results in an unbalanced state.

FIG. 6 is a diagram 600 showing a balanced GRE tunnel system, in accordance with an example embodiment of the present disclosure. As shown in diagram 600, GRE tunnel C has been migrated to server 2 512 without the need for any changes to the tunnel configuration. Although a balancing of load by allocation of GRE tunnels to a second server is shown, if capacity is reduced, then GRE tunnels can likewise be consolidated onto server 1 510 by reallocating all of the tags to that server. In either case, the effect of the reallocation on host 1 502 through host 4 508 is transparent to the hosts. Even when DNS caching occurs, each host is still connecting to the same address, which allows the migration to occur transparently. In addition, the allocation or deallocation can be based on historical data, such as where allocation of addresses to a new server is performed when the number of GRE tunnels is increasing, and where deallocation of addresses from a greater number of servers to a smaller number of servers is performed when the number of users is decreasing.

Figure 7:
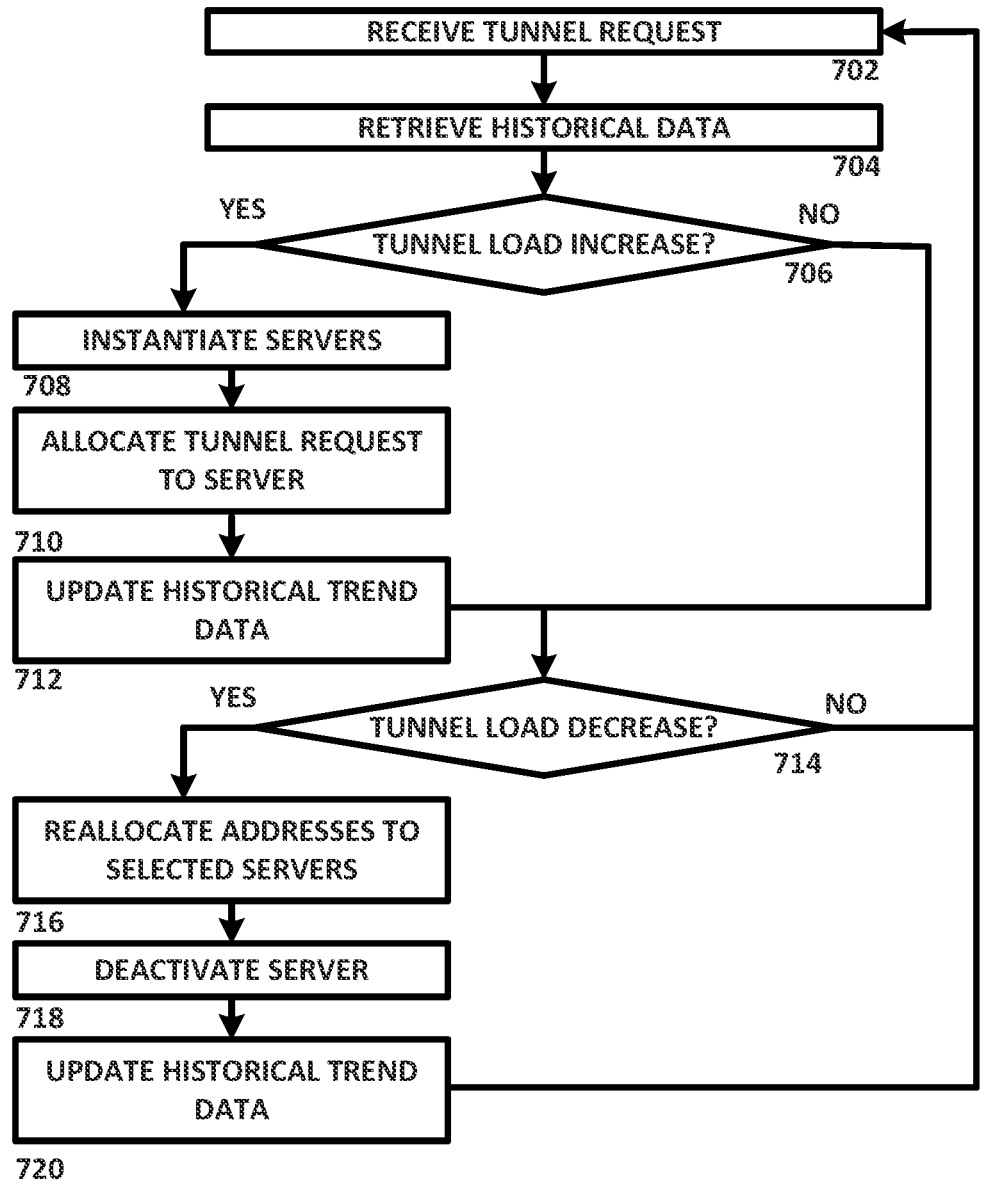
FIG. 7 is a diagram of an algorithm for allocating GRE tunnels, in accordance with an example embodiment of the present disclosure.

FIG. 7 is a diagram of an algorithm 700 for allocating GRE tunnels, in accordance with an example embodiment of the present disclosure. Algorithm 700 can be implemented in hardware or a suitable combination of hardware and software, and can be one or more algorithms operating on one or more processors.

Algorithm 700 begins at 702, where a processor receives a tunnel request under algorithmic control. In one example embodiment, the tunnel request can be generated by a host or client, and can be transmitted over a network to the processor, where an algorithm operating on the processor is configured to monitor a buffer for new messages that can include a tunnel request or other suitable data. The tunnel request can be a GRE tunnel request, a tunnel request from an IPSec client, or other suitable tunnel requests. The algorithm then proceeds to 704.

At 704, the processor retrieves historical server loading data in response to one or more controls generated by a control algorithm operating on the processor. In one example embodiment, the historical server loading data can be retrieved from a predetermined data storage location, and can include current loading data for each server or group of servers that is supporting the requested tunnel protocol, historical data or trend data for each server or group of servers or other suitable data. The algorithm then proceeds to 706.

At 706, it is determined whether a tunnel load increase is occurring. In one example embodiment, a processor operating under algorithmic control can determine the change in server load for supporting tunnel requests, can process trend data or can process other suitable data and can determine whether an increase in tunnel load is occurring, whether any variations in load data are within normal variations and do not require further action, or other suitable state or function data. If it is determined that a tunnel load increase is occurring, the algorithm proceeds to 708, otherwise the algorithm proceeds to 714.

At 708, one or more servers are instantiated. In one example embodiment, a first processor operating under algorithmic control can send a request to a second processor operating algorithmic control, where the algorithms are configured to cooperate and to instantiate a server operating on the second processor, such as by executing one or more additional algorithms to support the use of a tunneling protocol by a host or client machine. The algorithm then proceeds to 710.

At 710, the tunnel request is allocated to a server. In one example embodiment, an algorithm operating on a processor can determine whether to allocate a new tunnel to an existing server, to a newly instantiated server or to other suitable servers that are configured to support data communications through the tunnel. The target server can also implement one or more algorithms in response to allocate the tunnel to the host or client machine that is requesting the tunnel, including but not limited to assigning an IPv6 address to the host or client that includes a first address portion that is used to identify a group of servers and a second address portion that is used to identify the host or client, the tunnel or other suitable data. The algorithm then proceeds to 712.

At 712, historical trend data is updated. In one example embodiment, a processor operating under algorithmic control can determine a historical data set to update, such as server loading data, server loading trend data or other suitable data. The algorithm then proceeds to 714.

At 714, it is determined whether a tunnel load decrease is occurring. In one example embodiment, a processor operating under algorithmic control can determine the change in server load for supporting tunnel requests, can process trend data or can process other suitable data and can determine whether a decrease in tunnel load is occurring, whether any variations in load data are within normal variations and do not require further action, or other suitable state or function data. If it is determined that a tunnel load decrease is occurring, the algorithm proceeds to 716, otherwise the algorithm returns to 702.

At 716, tunnel service addresses are reallocated to a one or more selected server. In one example embodiment, an algorithm operating on a processor can determine whether to allocate existing tunnel service addresses to a single existing server, to multiple different existing servers or to other suitable servers that are configured to support data communications through the tunnel. In this example, the loading on a plurality of servers may be assessed by the processor operating under algorithmic control to identify a subset of servers that have the optimal location, processing power, storage capability, bandwidth or other suitable operating parameters, and can reallocate one or more services addresses to the selected servers. The target server or servers can also implement one or more algorithms in response to reallocate the tunnel or tunnels for the host or client machine or machines that is/are utilizing the tunnel(s), including but not limited to assigning an IPv6 address to the host or client that includes a first address portion that is used to identify a group of servers and a second address portion that is used to identify the host or client, the tunnel or other suitable data. The algorithm then proceeds to 718.

At 718, one or more servers are deactivated. In one example embodiment, a first processor operating under algorithmic control can send a request to a second processor operating algorithmic control, where the algorithms are configured to cooperate and to deactivate a server operating on the second processor, such as by executing one or more additional algorithms to support deactivation of the use of a tunneling protocol by a host or client machine. The algorithm then proceeds to 720.

At 712, historical trend data is updated. In one example embodiment, a processor operating under algorithmic control can determine a historical data set to update, such as server loading data, server loading trend data or other suitable data. The algorithm then returns to 702.

Although algorithm 700 is shown as a flow chart algorithm, it can also or alternatively be implemented using object oriented programming, ladder diagrams, state diagrams or other suitable programming paradigms. Algorithm 700 can be implemented on a single processor, on multiple processors or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling data services, comprising:
a plurality of host computers configured to communicate over the network and to request a data tunnel;
a plurality of server computers configured to provide data tunnel services to the plurality of host computers; and
an address allocator operating on one or more processors and configured to implement one or more algorithms that cause a range of addresses to be assigned to each of the server computers, wherein each of the host computers receives one of the addresses for use as part of a data tunnel service request from the host computer to the server computer;
wherein the range of addresses comprises a static address portion and a dynamic address portion and the address allocator is further configured to migrate one of the data tunnel services from a first server computer to a second server computer in response to load balancing by modifying the static address portion from a first static address portion associated with the first server computer to a second static address portion associated with the second server computer.

2. The system of claim 1 wherein the range of addresses comprises a static address portion that is identical for each address of the range of addresses and a dynamic address portion that is different for each address of the range of addresses.

3. The system of claim 1 wherein the range of addresses comprises a static address portion that is a predetermined number of identical bits of an IPv6 address for each address of the range of addresses and a dynamic address portion that is different for each address of the range of addresses.

4. The system of claim 1 wherein the range of addresses comprises a static address portion for each address of the range of addresses and a dynamic address portion that is a predetermined number of bits of an IPv6 address that is different for each address of the range of addresses.

5. The system of claim 1 wherein the range of addresses comprises a static address portion that is a predetermined number of identical bits of an IPv6 address for each address of the range of addresses and a dynamic address portion that is a predetermined number of bits of an IPv6 address that is different for each address of the range of addresses.

6. The system of claim 1 wherein the range of addresses comprises a static address portion that is a predetermined number of identical bits of a most significant bit field of an IPv6 address for each address of the range of addresses and a dynamic address portion that is a predetermined number of bits of an IPv6 address that is different for each address of the range of addresses.

7. The system of claim 1 wherein the range of addresses comprises a static address portion that is a predetermined number of identical bits of a most significant bit field of an IPv6 address for each address of the range of addresses and a dynamic address portion that is a predetermined number of bits of a least significant bit field of an IPv6 address that is different for each address of the range of addresses.

8. The system of claim 1 wherein the one or more algorithms select an address for use as part of the data tunnel service request from the host computer to the server computer based on a load at each server computer to perform load balancing for generic routing encapsulation tunnels.

9. A method for controlling data services, comprising:
identifying a plurality of host computers configured to communicate over the network to request a data tunnel;
identifying a plurality of server computers configured to provide data tunnel services to the plurality of host computers; and
assigning a range of addresses to each of the server computers, wherein each of the host computers receives one of the addresses for use as part of a data tunnel service request from the host computer to the server computer;
wherein the range of addresses comprises a static address portion and a dynamic address portion and further comprising migrating one of the data tunnel services from a first server computer to a second server computer in response to load balancing by modifying the static address portion from a first static address portion associated with the first server computer to a second static address portion associated with the second server computer.

10. The method of claim 9 wherein the range of addresses comprises a static address portion that is identical for each address of the range of addresses and a dynamic address portion that is different for each address of the range of addresses, and each address is associated with a generic routing encapsulation tunnel.

11. The method of claim 9 wherein the range of addresses comprises a static address portion that is a predetermined number of identical bits of an IPv6 address for each address of the range of addresses and a dynamic address portion that is different for each address of the range of addresses and further comprising migrating one of the data tunnel services from a first server computer to a second server computer in response to load balancing by modifying the static address portion without changing a tunnel configuration associated with the migrated data tunnel service.

12. The method of claim 9 wherein the range of addresses comprises a static address portion for each address of the range of addresses and a dynamic address portion that is a predetermined number of bits of an IPv6 address that is different for each address of the range of addresses and further comprising migrating a generic routing encapsulation data tunnel from a first server computer to a second server computer.

13. The method of claim 9 wherein the range of addresses comprises a static address portion that is a predetermined number of identical bits of an IPv6 address for each address of the range of addresses and a dynamic address portion that is a predetermined number of bits of an IPv6 address that is different for each address of the range of addresses and further comprising migrating a generic routing encapsulation data tunnel from a first server computer to a second server computer in response to load balancing by modifying the static address portion.

14. The method of claim 9 wherein the range of addresses comprises a static address portion that is a predetermined number of identical bits of a most significant bit field of an IPv6 address for each address of the range of addresses and a dynamic address portion that is a predetermined number of bits of an IPv6 address that is different for each address of the range of addresses.

15. The method of claim 9 wherein the range of addresses comprises a static address portion that is a predetermined number of identical bits of a most significant bit field of an IPv6 address for each address of the range of addresses and a dynamic address portion that is a predetermined number of bits of a least significant bit field of an IPv6 address that is different for each address of the range of addresses.

16. The method of claim 9 wherein each of the host computers receives one of the addresses for use as part of the data tunnel service request from the host computer to the server computer based on a load at each server computer to perform load balancing.

17. A method for controlling data services, comprising:
identifying a plurality of host computers configured to communicate over the network to request a data tunnel;
identifying a plurality of server computers configured to provide data tunnel services to the plurality of host computers; and
assigning a range of addresses to each of the server computers, wherein each of the host computers receives one of the addresses for use as part of a data tunnel service request from the host computer to the server computer;
wherein the range of addresses comprises a static address portion that is a predetermined number of identical bits of an IPv6 address for each address of the range of addresses and a dynamic address portion that is different for each address of the range of addresses and further comprising migrating one of the data tunnel services from a first server computer to a second server computer in response to load balancing by modifying the static address portion from a first static address portion associated with the first server computer to a second static address portion associated with the second server computer without changing a tunnel configuration associated with the migrated data tunnel service.

18. The method of claim 17 wherein the range of addresses comprises a static address portion that is identical for each address of the range of addresses and a dynamic address portion that is different for each address of the range of addresses, and each address is associated with a generic routing encapsulation tunnel.

19. The method of claim 17 wherein the range of addresses comprises a static address portion for each address of the range of addresses and a dynamic address portion that is a predetermined number of bits of an IPv6 address that is different for each address of the range of addresses and further comprising migrating a generic routing encapsulation data tunnel from a first server computer to a second server computer.

20. The method of claim 17 wherein each of the host computers receives one of the addresses for use as part of the data tunnel service request from the host computer to the server computer based on a load at each server computer to perform load balancing.

* * * * *